June 15, 1948. K. F. FINLAY 2,443,577
METHOD OF BRAZING TUBE ENDS
Filed Oct. 4, 1943 2 Sheets-Sheet 1
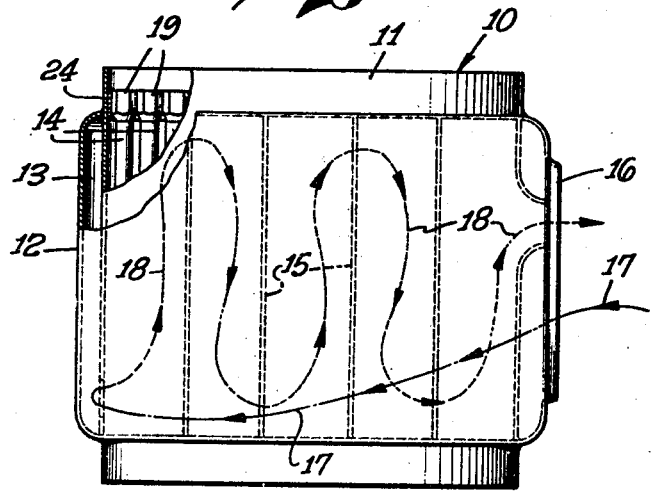
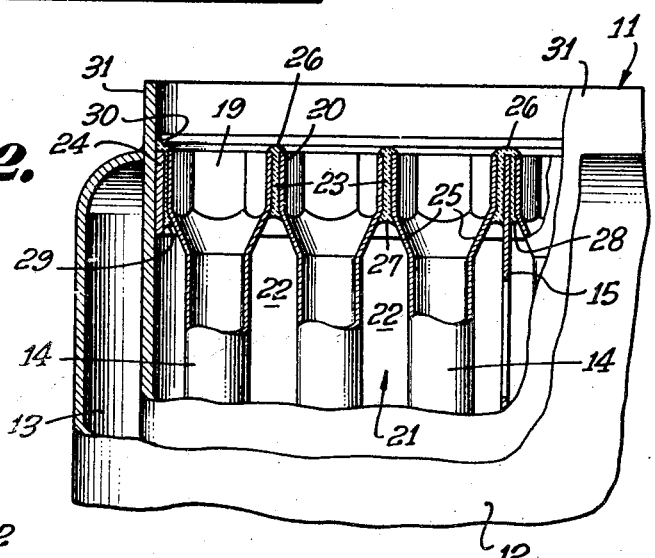
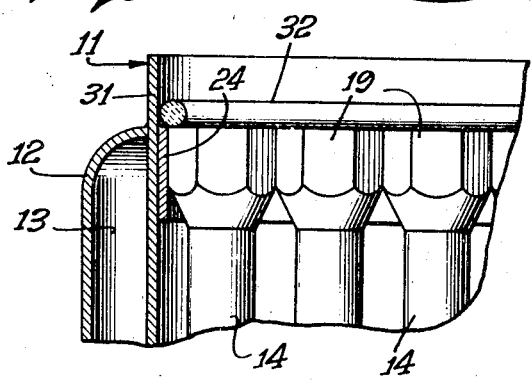
KEITH F. FINLAY,
INVENTOR.
BY
ATTORNEY.

June 15, 1948. K. F. FINLAY 2,443,577
METHOD OF BRAZING TUBE ENDS
Filed Oct. 4, 1943 — 2 Sheets-Sheet 2
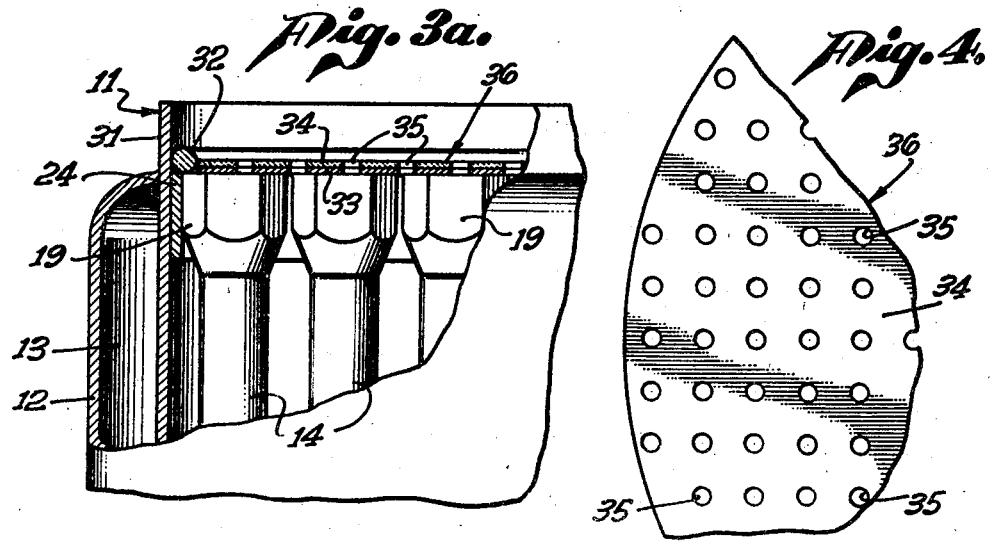
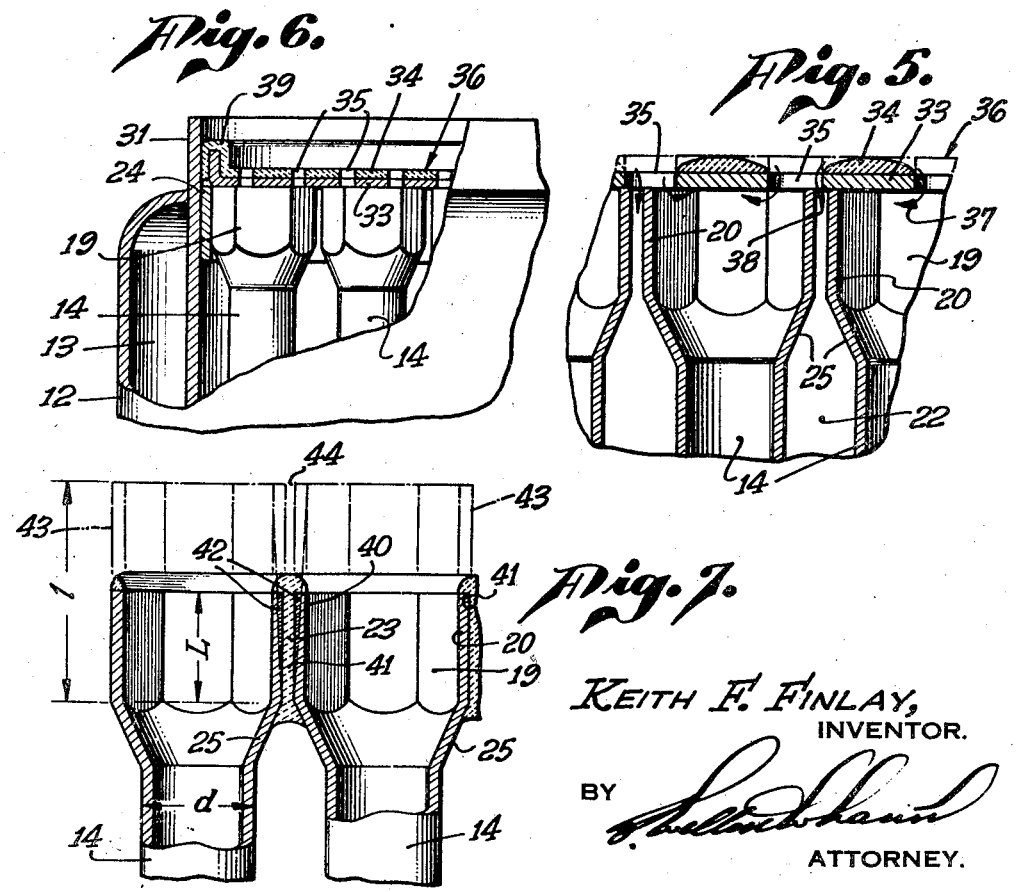
KEITH F. FINLAY,
INVENTOR.
BY
ATTORNEY.

Patented June 15, 1948

2,443,577

UNITED STATES PATENT OFFICE 2,443,577

METHOD OF BRAZING TUBE ENDS

Keith F. Finlay, Los Angeles, Calif., assignor to The Garrett Corporation, Airesearch Manufacturing Company division, Los Angeles, Calif., a corporation of California Application October 4, 1943, Serial No. 504,836

9 Claims. (Cl. 113—112)

My invention relates to the art of making oil coolers and devices of a similar nature wherein thin walled metal tubes are extended in side by side relation through a chamber, and relates in particular to a method of brazing the ends of an assembly of tubes for or in a heat-exchange device of this character.

The present method is especially suited for the brazing or soldering of the ends of thin walled aluminum, or aluminum alloy, tubes by use of a filler or solder having a melting point which approaches close to the melting point of the metal of the tubes. This aluminum metal has a melting point of approximately 1200° F. and the filler or solder now obtainable has a melting point of substantially 1075° F. The use of flux with a low working temperature washes the solder in such a manner that the working temperature of the solder is reduced lower than the ordinary melting point of the solder. The soldering operation must be performed at a temperature which approaches very close to the melting point of the aluminum metal, with the result that consistent obtaining of a perfect or acceptable weld is difficult when known brazing methods are employed. A further difficulty encountered in the brazing of aluminum results from the highly corrosive character of the flux compound which must be employed, and in attempts to perform brazing operations on thin walled aluminum tubes, destruction or melting away of the end portions of the tubes quite frequently occurs. This may be due in part to the activity of the flux, but it is believed to be principally due to the alloying of the aluminum of the tubes with the filler metal or solder, thereby producing at the extreme ends of the tubes an aluminum alloy metal structure having a melting point lower than the melting point of the original aluminum. As alloy penetrates the tube, the tube melting point more nearly approaches the melting temperature of the solder. Accordingly, in the use of the ordinary brazing operations this aluminum alloy formed at the ends of the tubes in the manner described in the preceding sentences tends to crumple or melt away if the brazing temperature is raised but little above the melting point of the filler.

It is an object of my invention to provide a method of brazing which, under conditions such as described in the foregoing, will consistently produce a strong, leak-proof, joint or weld.

A further object of the invention is to provide a process of the character set forth in the foregoing wherein flux etching is substantially eliminated or minimized. At the temperatures involved in the brazing operation the corrosive nature of the flux produces an etching action on the contacted surfaces of the tubes, the progress of this etching action being nearly in proportion to the time of contact of the flux at high temperature with the metal. In my new process the time of contact of the flux with the metal to be brazed is reduced substantially to an absolute minimum, and therefore the etching of the metal is accordingly minimized.

A further object of the invention is to provide a method of the above character, wherein dipping of the tubes to be brazed into either or both flux and molten metal baths is eliminated. Metal and flux pots and equipment to fire the same are avoided, and since the process does not require a molten metal bath, the surface of which must be constantly skimmed, the danger of poor joints resulting from the presence of scum on the surface of the molten metal is avoided.

A further object of the invention is to provide a method of brazing the ends of tubes wherein the filler is brought into contact substantially only with the limited surfaces of the tube parts to which the filler is to adhere in forming the joints between the tube ends.

A further object of the invention is to provide a method of brazing the ends of metal parts wherein the quantity of brazing material or filler and flux is controlled, so that the amount of filler material entering into the joints is sufficient to produce a maximum-strength bond, without excess material. A valuable feature of the invention is that by the use of the method, internal fillets are formed between the ends of the joined tubes and recesses in which flux may lodge are avoided. This condition facilitates the cleaning of residual flux from the metal walls after completion of the brazing operation.

Further objects and advantages of the invention will be brought out in the following part of the specification.

Referring to the drawings which are for illustrative purposes only,

Fig. 1 is a partly sectioned view showing an oil cooler made in accordance with my invention.

Fig. 2 is an enlarged fragmentary section corresponding with the sectioned portion of Fig. 1.

Fig. 3 is a fragmentary section to illustrate a stage in the process just prior to the melting of the flux and the filler.

Fig. 3a is a view similar to Fig. 3 showing the succeeding step of my process.

Fig. 4 is a fragmentary plan view of the composite filler and flux member shown in Fig. 3.

Fig. 5 is an enlarged fragmentary section showing several tube ends and indicating the course of travel of the melted flux.

Fig. 6 is an enlarged fragmentary sectional view showing a different manner of applying the filler material and flux.

Fig. 7 is an enlarged fragmentary sectional view showing two adjacent tube wall portions and illustrating the manner in which the filler alloys with the metal tube walls.

In Fig. 1 I show an oil cooler 10 of a general type developed for use with aircraft engines. As now well known in the art, this oil cooler 10 has a cylindric shell 11 and very often includes a cylindrical metal jacket 12 to form an oil passage or chamber 13 around the exterior of the shell 11, through which hot oil may be passed to warm up the interior of the cooler as occasion may require. The interior space of the shell 11, through which the oil to be cooled is caused to flow, has therein tubes 14 and may include a complement of baffle plates 15 for directing the flow of oil through the spaces between the tubes 14. In Fig. 1 I have indicated an inlet and outlet fitting 16 and by the use of phantom arrows 17, have indicated an inlet flow of hot oil through the passage 13 of the jacket 12, and by dotted arrows 18, have indicated the passage of oil through the cooler interior to the outlet opening of the fitting 16.

In Fig. 2 I have shown that the tubes 14, which substantially fill the interior of the shell 11 in side by side relation in keeping with known practice, have enlarged polygonal ends 19, preferably hexagonal, which ends 19 are nested together so that when the substantially flat walls 20 of the tube ends 19 are brazed or soldered as shown, an end wall is formed for the interior space 21 of the cooler, which interior space consists of the relatively narrow spaces or passages 22, defined within the shell 11 by the exterior faces of the tubes 14.

Those familiar with the art will understand that the tubes are assembled in side by side relation with the walls 20 of each tube end 19 contacting, or nearly so, walls of the adjacent tube end 19, but for the purpose of illustration, I have in the enlargement, Fig. 2, shown walls 23 of filler or solder between the walls 20 of the tube ends, between the faces of the baffle plates 15 and the adjacent walls 20, and between the side faces of a spacer ring 24 and the adjacent tube walls and also adjacent wall of the shell 11.

As further shown in Fig. 2, the walls 20 of the tube ends 19 merge with the smaller-diametered walls of the tube through tapered or flared wall sections 25. In the practice of my brazing process, beads 26 are consistently formed at the outer ends of the walls 20, the spaces adjacent the walls 20 are consistently filled with filler walls 23 and fillets 27 are formed at the lower ends of the filler walls 23 in the flared spaces between the upper portions of the tapered wall sections where they merge with the lower edges of the walls 20 of the tube ends 19. Similar fillets 28 are formed at 28 and 29, and a ring fillet 30 is formed around the periphery of the assembly of tube ends where a corner is formed with the adjacent cylindrical wall portion 31 of the shell 11. In the following I shall describe in detail the steps constituting a preferred practice of my invention, later pointing out how these details may be varied.

In the practice of the invention disclosed in the following, the metal parts to be brazed are of aluminum which melts at 1200° F., the filler is an alloy of aluminum melting at 1075° F., and the flux melts at 1000° F. The range of temperatures in which to perform the brazing operation is accordingly very small.

*Preliminary step*

The preliminary step in carrying out the process is to obtain or prepare an assembly of tubes with the enlargements 19 thereof in cooperative engagement. As shown in Fig. 3, the tubes 14 are disposed within a cooler shell 11 and a spacer ring or band 24 is shown around the assembly of tube ends. It will be understood that either of the walls 11 and 24 may be eliminated from the assembly, and, further, that both of the cylindric walls 11 and 24 may be eliminated and the tube ends may be held together by means of a circular clamping fixture, or fixture of other outline, in accordance with the shape selected for the cross section of the cooler. At the time the tubes and other aluminum parts are substantially clean, having been precleaned before assembly or cleaned after assembly so as to remove all grease and corrosion.

*First step*

The assembly shown in Fig. 3 then has applied thereto a ring 32 of filler material which may consist of a wire of the aluminum solder bent so that it will just pass within the cylindric wall portion 31 which encompasses the tube ends. The assembly is then heated, at least in the zone of the tube ends, to a temperature below the melting point of the aluminum and preferably near to the melting point of the solder. For example, the assembly is preferably heated to a temperature of about 1075° F., with a reasonable variation on each side of this value, but best results are obtained where the assembly is at this time heated to 1075° F. or slightly thereabove, for example, 1085° F. It will be recognized, however, that the temperature at this time produced in the assembly may be somewhat lower or within the range of 700° F. to 1000° F. and yet maintain some of the valuable features of the invention. That is to say, this method can be practiced employing the lower temperature stated of 700° F. to 1000° F. in the step of this method, in which case the assembly will have to remain in the furnace, in which the third step of the method is practiced, a somewhat longer period of time than would be necessary if the pre-heating (first step) were continued long enough to raise the temperature to about 1075° F. It should be understood that the first step of this method is a pre-heating step, and in practice any final temperature for the preheating can be employed ranging from 700° F. to 1075° F.

*Second step*

Now, without permitting the assembly to cool, it is disposed with the heated tube ends faced upward, and, as shown in Fig. 3a, a layer of filler 33 is placed on the upper face of the wall which is formed by the tube ends 19 disposed in side by side relation. This layer 33 is superimposed by a layer of flux 34. The filler 33 is so arranged that a multiplicity of openings 35 extend therethrough from the upper to the lower face of the layer of filler. In the preferred practice of the invention the layer of filler 33 and the layer of flux 34 are combined in a composite sheet 36 which is cut to circular form so that it may be readily dropped into the position in which it is shown in Fig. 3a.

As shown in Fig. 4, this sheet 36 has a plurality of openings 35 punched therethrough in substantially evenly spaced arrangement. In the preparation of the composite sheet 36, a sheet of the filler metal, of selected thickness, is cleaned and is then coated with a paste or gravy comprising powdereded flux mixed with a vehicle. The coating or layer of flux is then dried and the holes 35 punched. This gives a measured unit of filler and flux which may be quickly placed on the upper face provided by the tube ends, or in the position indicated in Fig. 3a.

Third step

The application of heat, at a temperature above the melting point of the flux and preferably slightly above the melting point of the filler, is continued so that, as shown in Fig. 5, the flux 34 will melt and flow down through the openings 35 as indicated by arrows 37, and thence into the spaces between the walls 20 of the tube ends 19 as indicated by arrows 38. The molten flux in pursuing its downward course, as indicated by arrows 37 and 38, will wash the surfaces of the filler 33 and then, in passing through the spaces between the walls 20, will clean the surfaces of these walls 20 for the subsequent reception of molten filler. As the heat application is continued at a temperature corresponding to the melting point of the filler, or slightly thereabove, the filler 33 will melt and flow down into the interstices between the walls 20 of the tube ends 19, this effect being produced in part by the capillary action resulting from the close spacing of the walls 20 and in part from the force of gravity acting on the molten filler. The melting of the filler 33 is accompanied by melting of the filler ring 32 so that brazing of the peripheral members of the assembly and formation of the bead or fillet 30 is accomplished.

Although the foregoing description of the preferred practice of the process indicates certain variations in temperatures, it will be recognized that optimum practice of the invention is to first heat the assembly to a temperature slightly above the melting point of the filler and to maintain this temperature during the placing of the filler and flux, melting of the flux, and melting of the filler so that the walls 20 of the tube ends 19 will be maintained constantly at a temperature to alloy with the molten filler when it is moved downward between the walls 20. After the brazing operation is completed at one end of the cooler, it may be turned end for end and the operation repeated without permitting material reduction in the temperature of the cooler as a whole. After brazing of one end of the assembly, there should be maintained a temperature differential between the two ends of the assembly so that during the brazing of the second end, the previously brazed end will be at a temperature below the melting point of the solder so that the brazed joints will be firm and solid. Permissible deviations in the practice of the process include the placing of the perforated sheet of filler material on the upper end face of the assembly of tubes prior to the initial application or during the initial application of heat and then applying the flux to the upper surface of the filler material when a temperature corresponding to the melting point of the flux is reached. Also, as shown in Fig. 6, the use of the ring 32 of filler material may be avoided by making the disc or plate 36 of filler material and sufficiently oversize so that a flange 39 may be turned up around its periphery, this flange providing the quantity of filler material and flux required for the brazing of the peripheral joints of the assembly.

Additional valuable results obtained in the practice of the invention are—reduction in the weight of the assembly by reducing the quantity of solder employed, greater tube length exposed to contact with the oil or a tube of given length by reduction of the length of the hexagonal end, consistent formation of the fillets 27 at the points of transition between the enlarged tube ends and the smaller body portions of the tubes, so that protection against collapse or rupture of the enlarged tube ends is avoided. Also, these internal fillets produce a continuous network seal between the joints of the tube ends so that leakage of the structure is avoided, even though there may be areas between contacting portions of the side walls 20 of the tube ends to which the filler has not adhered. The foregoing may be explained as follows. It has been observed that in the brazing of the hexagon ends of tubes voids are caused between the flaps due to poor flow of the flux into the capillary passages, or due to such close clearances that the flux, while it loosens and removes the oxide from the surface of the wall 20, may fail to wash out this oxide, the result being that the brazing action is interrupted at this point. However, in the practice of the process disclosed herein, the fillets 27 at the transition are continuous or complete so that these fillets not only serve in their strengthening capacity, but also give assurance of complete sealing of the end walls of the cooler structure formed by the brazed or solder hexagonal enlargements and the filler material.

As shown in Fig. 7, my process involves the use of enlargements 19 on the ends of the tubes 14 having a length L which is less than the diameter $d$ of the tube, and the length L has a value between one-half $d$ and $d$, but preferably about five-eighths $d$. For example, where the tube has a diameter $d$ of approximately one-quarter inch, the length L will be $\frac{5}{32}$ inch as compared to the standard hex end which is one-half inch long, or substantially two $d$. One of the results obtained from this short length of tube end is the substantial avoidance of the breaking down of the lips 40 of the walls 20 of the tube ends 19. When the solder comprising the bonding wall 23 flows into the interstice 41 between the walls 20, an alloying of the filler material with the metal of the walls 20 starts, and this alloying action progresses into the metal of the walls 20, for example, as indicated by the darkened areas 42, a distance which varies somewhat in proportion to the time of contact of the molten filler material with the walls 20. This time of contact of the molten filler material with the walls 20 in turn varies with the distance the filler material must travel through the interstice 40 between the walls 20 to the point of transition 25 at which the fillet 27 is formed. Accordingly, if the walls 20 of the enlarged tube ends 19 are given a length $l$, such as indicated by dotted lines 43, the time required for the molten filler material to travel from the mouth 44 of the relatively long interstice 41 to the transition point 25 will be so great that the alloying action will progress entirely through the metal walls 20 at their ends or outer edges, so that these outer edges then, instead of comprising the original metal, will consist of an alloy having a melting point lower than the melting point of the metal from which the walls 20 are formed, the result being that the outer edges of the walls indcated by the dotted lines 43, will crumple or melt away and have a jagged appearance, which can be avoided only by a much closer control of temperatures than is necessary in the practice of the process herein disclosed.

I claim as my invention:

1. The method of brazing the ends of an assembly of metal tubes with a filler having a melting point slightly lower than the melting point of the metal of the tubes and using a flux having a melting point slightly lower than the melting point of the filler: placing the tubes with their ends substantially in engagement so as to form a tube assembly with the ends of the tubes which are to be brazed facing upward; applying heat to at least the upper ends of the tubes to bring the same to a temperature near to the melting point of the filler; placing on the upper ends of the tubes a quantity of the filler in the form of a sheet in which a plurality of passages are provided; placing said flux on the upper face of said quantity of filler; continuing the application of heat to melt said flux whereby the same will flow down through the passages of said filler to wash the surfaces thereon and then flow down within the interstices between the tube ends to clean the opposed surfaces of the tube ends, and melting said filler so that it will flow down into the interstices between the tube ends; cooling the tube ends; and then removing residual flux from the brazed assembly.

2. The method of brazing the ends of an assembly of metal tubes with a filler having a melting point slightly lower than the melting point of the metal of the tubes and using a flux having a melting point slightly lower than the melting point of the filler: placing the tubes with their ends substantially in engagement so as to form a tube assembly with the ends of the tubes which are to be brazed facing upward; and in the presence of heat disposing on the upper face of the tube assembly a layer of sheet filler having a multiplicity of passages therethrough and a layer of flux, in such manner that the flux will lie on the upper face of said filler, so that the action of the heat will be to first melt the flux so that it will flow down through the passages of the filler to wash the same and then into the interstices between the tube ends of the assembly to prepare the opposing surfaces thereof, and continuing the application of heat to melt the filler so that it will follow the flux into said interstices.

3. The method of brazing the ends of an assembly of metal tubes with a filler having a melting point slightly lower than the melting point of the metal of the tubes and using a flux having a melting point slightly lower than the melting point of the filler: placing the tubes with their ends substantially in engagement so as to form a tube assembly with the ends of the tubes which are to be brazed facing upward; applying heat at least to the upper ends of said tubes to bring the same to a temperature near to the melting point of the filler; and in the presence of heat disposing on the upper face of the tube assembly a sheet of filler and a layer of flux thereover, said sheet of filler having a multiplicity of passages leading from the upper face to the lower face thereof, the action of the heat being such as to first melt the flux so that it will flow down through the passages of the filler to wash the same and then into the interstices between the tube ends of the assembly to prepare the opposing surfaces thereof, and continuing the application of heat to melt the filler so that it will follow the flux into said interstices.

4. The method of brazing the ends of an assembly of metal tubes with a filler having a melting point slightly lower than the melting point of the metal of the tubes and using a flux having a melting point slightly lower than the melting point of the filler: arranging the tubes in parallel relationship with their ends to be brazed facing upwardly and substantially in engagement so as to form a tube assembly; in the presence of heat in the zone of the tube ends to be brazed, disposing against the upper face of the assembly formed by the tube ends to be brazed, a sheet of the filler having passages therethrough from the far face to the near face thereof; causing melted flux to flow from said far face of the filler through said passages, so as to clean the surfaces of the filler and then flow into the interstices between the tube ends to prepare the opposing surfaces thereof for the reception of filler; and melting the filler at a temperature below the melting point of the metal of the tube ends so that said filler will flow into said interstices.

5. A method of brazing the ends of an assembly of metal tubes arranged vertically in side by side relation by use of a filler having a melting point slightly less than the melting point of the metal of the tube ends and a flux having a melting point slightly less than the melting point of the filler, wherein: in the presence of heat in the zone of the tube ends to be brazed there is positioned against the upper face of the assembly formed by the tube ends to be brazed a sheet of the filler having passages therethrough from the far face to the near face thereof; melted flux is caused to flow from said far face of the filler through said passages, so as to clean the surfaces of the filler and then flow into the interstices between the tube ends to prepare the opposing surfaces thereof for the reception of filler; and the filler is then melted at a temperature below the melting point of the metal of the tube ends so that said filler will flow into said interstices.

6. A method of brazing the ends of an assembly of aluminum tubes placed in side by side relation, the aluminum of the tube ends having a melting point of approximately 1200° F., wherein: in the presence of heat in the zone of the tube ends to be brazed there is positioned against the face of the assembly formed by the tube ends to be brazed a layer of the filler having a melting point of about 1075° F. and having passages therethrough from the far face to the near face thereof; a flux having a melting point of about 1000° F. is heated to a temperature of above 1000° F. and below 1200° F. and caused to flow from said far face of the filler through said passages, so as to clean the surfaces of the filler and then flow into the interstices between the tube ends to prepare the opposing surfaces thereof for the reception of filler; and the tube ends, the flux and the filler are heated to a temperature of about 1075° F. but not higher than 1200° F. so that said filler will flow into said interstices.

7. The method of brazing the ends of an assembly of metal tubes with a filler having a melting point slightly lower than the melting point of the metal of the tubes and using a flux having a melting point slightly lower than the melting point of the filler: placing the tubes with their ends substantially in engagement so as to form a tube assembly with the ends of the tubes which are to be brazed facing upward; and in the presence of heat disposing on the upper face of the tube assembly a perforated sheet of filler and a sheet of flux thereover, so that the heat will first melt the flux and cause it to flow down through the perforations in the filler to wash the same and then into the interstices between the tube ends of the assembly to prepare the opposing surfaces thereof, and continuing the application of heat to melt the filler so that it will follow the flux into said interstices.

8. The method of brazing the ends of an assembly of metal tubes with a filler having a melting point slightly lower than the melting point of the metal of the tubes and using a flux having a melting point slightly lower than the melting point of the filler: placing the tubes with their ends substantially in engagement so as to form a tube assembly with the ends of the tubes which are to be brazed facing upward; and in the presence of heat disposing on the upper face of the tube assembly a composite perforated sheet comprising a layer of filler and a layer of flux thereover, the action of the heat being such as to first melt the flux so that it will flow down through the passages of the filler to wash the same and then into the interstices between the tube ends of the assembly to prepare the surfaces to be brazed, and continuing the application of heat to melt the filler so that it will follow the flux into said interstices.

9. The method of brazing the ends of an assembly of aluminum tubes with a filler having a melting point slightly lower than the melting point of the metal of the tubes and using a flux having a melting point slightly lower than the melting point of the filler: placing the tubes with their ends substantially in engagement so as to form a tube assembly with the ends of the tubes which are to be brazed facing upward; and in the presence of heat disposing on the upper face of the tube assembly a perforated sheet of aluminum solder and a layer of flux thereover, the action of the heat being such as to first melt the flux so that it will flow down through the passages of the filler to wash the same and then into the interstices between the tube ends of the assembly to prepare the surfaces thereof to be brazed and then to melt the filler so that it will follow the flux into said interstices.

KEITH F. FINLAY.

REFERENCES CITED

The following references are of record in the file of this patent:

UNITED STATES PATENTS

| Number | Name | Date |
| --- | --- | --- |
| 1,067,415 | Egner | July 15, 1913 |
| 1,956,233 | Braun | Apr. 24, 1934 |
| 2,001,186 | Dornier | May 14, 1935 |
| 2,061,850 | Roberts | Nov. 24, 1936 |
| 2,184,658 | Young | Dec. 26, 1939 |
| 2,302,505 | Rayniak | Nov. 17, 1942 |
| 2,389,175 | Woods | Nov. 20, 1945 |